United States Patent
Yoshida et al.

(10) Patent No.: US 12,534,648 B2
(45) Date of Patent: Jan. 27, 2026

(54) LAMINATE AND ARTICLE WITH LAMINATE

(71) Applicant: AGC INC., Tokyo (JP)

(72) Inventors: Takashi Yoshida, Tokyo (JP); Shuhei Ochi, Tokyo (JP); Takashi Takayanagi, Tokyo (JP)

(73) Assignee: AGC INC., Tokyo (JP)

( * ) Notice: Subject to any disclaimer, the term of this patent is extended or adjusted under 35 U.S.C. 154(b) by 236 days.

(21) Appl. No.: 18/234,982

(22) Filed: Aug. 17, 2023

(65) Prior Publication Data

US 2023/0399549 A1    Dec. 14, 2023

Related U.S. Application Data

(63) Continuation of application No. PCT/JP2022/015656, filed on Mar. 29, 2022.

(30) Foreign Application Priority Data

Mar. 31, 2021   (JP) .................... 2021-059971

(51) Int. Cl.
    *C09J 7/38*      (2018.01)
    *C09J 7/25*      (2018.01)
    *C09J 11/08*     (2006.01)

(52) U.S. Cl.
    CPC .......... *C09J 7/385* (2018.01); *C09J 7/25* (2018.01); *C09J 11/08* (2013.01); *C09J 2301/408* (2020.08); *C09J 2301/414* (2020.08); *C09J 2427/00* (2013.01); *C09J 2433/00* (2013.01);

(Continued)

(58) Field of Classification Search
    None
    See application file for complete search history.

(56) References Cited

U.S. PATENT DOCUMENTS 5,183,504 A * 2/1993 Kuwajima ........... C09D 133/26
                                                     106/404
5,367,026 A * 11/1994 Okude ................. C09D 133/06
                                                     525/194

(Continued)

FOREIGN PATENT DOCUMENTS

JP    2000351952 A    12/2000
JP    2009066991 A    4/2009

(Continued)

OTHER PUBLICATIONS

Machine translation of WO 2019/124495 A1. (Year: 2019).*

(Continued)

*Primary Examiner* — Ramsey Zacharia
(74) *Attorney, Agent, or Firm* — Element IP, PLC

(57) ABSTRACT

To provide a laminate excellent in stretchability and solvent resistance. A laminate comprising a base film and a clear layer, wherein the clear layer is a layer formed by curing a composition containing a fluorinated polymer having hydroxy or carboxy groups, a non-fluorinated polymer, and a curing agent having functional groups that react with the hydroxy or carboxy groups, and the hydroxy value or acid value of the fluorinated polymer is at least 20 mgKOH/g, and the content of the fluorinated polymer is at most 30 mass % to the total content of the fluorinated polymer and the non-fluorinated polymer.

12 Claims, 1 Drawing Sheet

(52) U.S. Cl.
CPC ...... *C09J 2475/006* (2013.01); *C09J 2483/00* (2013.01)

(56) References Cited

U.S. PATENT DOCUMENTS

| | | | |
|---|---|---|---|
| 2007/0082992 A1* | 4/2007 | Huybrechts | C08G 18/4887 524/386 |
| 2020/0086613 A1 | 3/2020 | Saito et al. | |
| 2020/0316926 A1 | 10/2020 | Ochi et al. | |
| 2020/0317835 A1 | 10/2020 | Ochi et al. | |
| 2021/0095084 A1 | 4/2021 | Ochi et al. | |
| 2021/0101376 A1 | 4/2021 | Ochi et al. | |

FOREIGN PATENT DOCUMENTS

| | | | | |
|---|---|---|---|---|
| JP | 2021035723 A | 3/2021 | | |
| WO | WO-2019124495 A1 * | 6/2019 | ............. | B60R 13/04 |

OTHER PUBLICATIONS

Linseis, Polystyrene: A detained analysis (Year: 2025).*
Polymer Source, poly(glycidyl methacrylate): Product Profile (Year: 2025).*
Ullmann's Encyclopedia of Industrial Chemistry, Polyacrylates (Year: 2018).*
International Search Report issued Jun. 21, 2022 in PCT/JP2022/015656 (with English translation), 4 pages.

* cited by examiner

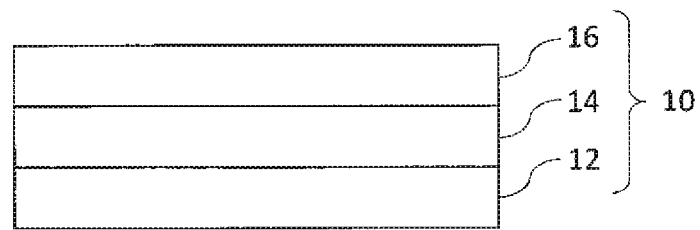

LAMINATE AND ARTICLE WITH LAMINATE

TECHNICAL FIELD

The present invention relates to a laminate and an article with a laminate.

BACKGROUND ART

A laminate may be applied to a component to be used in the field of automotive exterior parts, etc., for the purpose of surface protection. Patent Document 1 discloses a sheet for coating film protection, characterized in that an adhesive layer having a predetermined acrylic polymer blended to a base polymer consisting of a predetermined styrene block polymer, is provided on a support base material.

PRIOR ART DOCUMENT

Patent Document

Patent Document 1: JP-A-2000-351952

DISCLOSURE OF INVENTION

Technical Problem

The above laminate is required to be excellent in stretchability in order to be bonded to an article having a desired form. Further, it is also required to be excellent in solvent resistance to achieve good surface protection.

When the present inventors have examined the sheet for coating film protection as described in Patent Document 1, they have found it difficult to achieve both stretchability and solvent resistance.

Therefore, the present invention is concerned with providing a laminate excellent in stretchability and solvent resistance, and an article with such a laminate.

Solution to the Problem

As a result of an extensive study, the present inventors have found it possible to solve the problem by the following construction.

[1] A laminate comprising a base film and a clear layer, wherein the clear layer is a layer formed by curing a composition containing a fluorinated polymer having hydroxy or carboxy groups, a non-fluorinated polymer, and a curing agent having functional groups that react with the hydroxy or carboxy groups, the hydroxy value or acid value of the fluorinated polymer is at least 20 mgKOH/g, and the content of the fluorinated polymer in the composition is at most 30 mass % to the total content of the fluorinated polymer and the non-fluorinated polymer.
[2] The laminate according to [1], wherein the content of the fluorinated polymer in the composition is at most 5 mass % to the total content of the fluorinated polymer and the non-fluorinated polymer.
[3] The laminate according to [1] or [2], wherein the content of the fluorinated polymer in the composition is at least 0.1 mass % to the total content of the fluorinated polymer and the non-fluorinated polymer.
[4] The laminate according to any one of [1] to [3], wherein the number average molecular weight of the fluorinated polymer is at most 6,000.
[5] The laminate according to any one of [1] to [4], wherein the hydroxy value or acid value of the fluorinated polymer is at most 400 mgKOH/g.
[6] The laminate according to any one of [1] to [5], wherein the fluorinated polymer is a fluorinated polymer having hydroxy groups.
[7] The laminate according to any one of [1] to [6], wherein the fluorinated polymer is a fluorinated polymer having hydroxy groups and its hydroxy value is at least 150 mgKOH/g.
[8] The laminate according to any one of [ ] to [7], wherein the composition contains at least one type as the non-fluorinated polymer selected from the group consisting of a (meth)acrylic polymer, a polyester polymer, a polyoxyalkylene polymer and a polycarbonate polymer.
[9] The laminate according to any one of [1] to [8], wherein the non-fluorinated polymer has hydroxy groups.
[10] The laminate according to any one of [1] to [9], wherein the composition further contains a silicone compound.
[11] The laminate according to [10], wherein the silicone compound is a silicone oil.
[12] The laminate according to any one of [1] to [11], wherein the composition further contains a UV absorber.
[13] The laminate according to any one of [1] to [12], wherein the material constituting the base film contains at least one type selected from the group consisting of a urethane resin and a vinyl chloride resin.
[14] An article with a laminate, having the laminate as defined in any one of [1] to [13].

Advantageous Effects of Invention

According to the present invention, it is possible to provide a laminate excellent in stretchability and solvent resistance, and an article with such a laminate.

BRIEF DESCRIPTION OF DRAWING

FIG. 1 is a schematic side view showing an example of the laminate of the present invention.

DESCRIPTION OF EMBODIMENTS

The meanings of the terms in the present invention are as follows.

A (meth)acrylate is a generic term for an acrylate and a methacrylate. Similarly, (meth)acrylic acid is a generic term for acrylic acid and methacrylic acid, and a (meth)acrylamide is a generic term for an acrylamide and a methacrylamide. Further, a (meth)acrylic polymer means a polymer containing mainly units based on a (meth)acrylate, and a (meth)acrylic resin means a resin composed of a (meth)acrylic polymer.

A unit is a generic term for an atomic group based on one molecule of a monomer, which is formed directly by polymerization of the monomer, and an atomic group obtained by chemical conversion of a part of the above atomic group after polymerization. Here, the content (mol %) of each unit relative to the entire units contained in the polymer is obtainable by analyzing the polymer by the nuclear magnetic resonance spectrum (NMR) method.

The acid value and the hydroxy value are, respectively, values measured in accordance with the methods of JIS K0070-3 (1992).

The glass transition temperature (Tg) is the midpoint glass transition temperature of the polymer, as measured by the differential scanning calorimetry (DSC) method.

The softening temperature is a value measured in accordance with the method of JIS K7196 (1991).

The number average molecular weight (Mn) and the weight average molecular weight (Mw) are values measured by gel permeation chromatography using polystyrene as a standard material.

The thickness of the laminate is a value to be measured by using an eddy current film thickness meter. As the eddy current film thickness meter, for example, EDY-5000 manufactured by Sanko Electronic Laboratory Co., Ltd. may be used. The thicknesses of the respective layers in the laminate can be calculated from the ratio of the thicknesses of the respective layers obtainable by observing the cross-section of the laminate with a scanning electron microscope equipped with an energy dispersive X-ray analyzer and the thickness of the laminate.

The total light transmittance is a value to be measured by a D light source in accordance with JIS K7361-1:1997.

The mass of the solid content of a composition is, when the composition contains a solvent, the mass of the composition after removing the solvent from the composition. Here, with respect to components constituting the solid content of the composition other than the solvent, even if they are in liquid form, they are considered to be the solid content. Here, the mass of the solid content of the composition is obtained as the mass remaining after heating 1 g of the composition at 130° C. for 20 minutes.

The laminate of the present invention (hereinafter referred to also as the present laminate) comprises a base film and a clear layer, wherein the above clear layer is a layer formed by curing a composition containing a fluorinated polymer having hydroxy or carboxy groups, a non-fluorinated polymer and a curing agent having functional groups that react with the above hydroxy or carboxy groups, the hydroxy value or acid value of the above fluorinated polymer is at least 20 mgKOH/g, and the content of the above fluorinated polymer in the above composition is at most 30 mass % to the total content of the above fluorinated polymer and the above non-fluorinated polymer.

The mechanism by which the present laminate having such a structure is excellent in stretchability and solvent resistance is not necessarily clear, but is considered to be as follows.

That is, the laminate of the present invention has a clear layer. The composition to be used to form the above clear layer contains a fluorinated polymer having a hydroxy value or acid value of at least a predetermined value, and a curing agent, and it is considered to impart good solvent resistance to the above clear layer formed by curing of such composition.

Further, the above composition also contains a non-fluorinated polymer, and the content of the above fluorinated polymer is specified to be at most a predetermined value to the total content of the above fluorinated polymer and the above non-fluorinated polymer. Since the content of the above fluorinated polymer is at most the specified value, deterioration of flexibility caused by the above fluorinated polymer in the clear layer formed by curing of such composition is suppressed. Therefore, it is considered that when the laminate is stretched, rupture in the clear layer is less likely to occur, and the present laminate is excellent also in stretchability.

First, the construction of the present laminate will be explained with reference to the drawing.

FIG. 1 is a schematic side view showing the layered structure of a laminate 10 (the present laminate) as an embodiment of the present invention. The laminate 10 has a bonding layer 12, a base film 14 and a clear layer 16, and the respective layers are arranged in this order.

When the bonding layer 12 of the laminate 10 is press-bonded to an article whose surface is to be protected, an article with the laminate is obtained, in which the clear layer 16, the base film 14, the bonding layer 12 and the article are arranged in this order. Thus, the clear layer 16 is located on the top surface of the article with the laminate.

The laminate 10 may further have other layers as long as such does not violate the intent of the present invention.

In the following, the respective members constituting the present laminate will be described in detail.

The present laminate has a base film.

The base film serves as a support material to support each layer at the time of producing the present laminate.

As specific examples of the material to constitute the base film, a urethane resin (thermoplastic polyurethane, etc.), a vinyl chloride resin, a polyester resin, an ABS resin (acrylonitrile butadiene styrene copolymer), an AAS resin (acrylonitrile·acrylate·styrene copolymer), an AES resin (acrylonitrile·ethylene-propylene-diene·styrene copolymer), a (meth)acrylic resin, an olefin resin and a fluoropolymer may be mentioned. Among them, the material to constitute the base film preferably contains at least one type selected from the group consisting of a urethane resin and a vinyl chloride resin, and it is particularly preferably a urethane resin or a vinyl chloride resin itself.

As the thickness of the base film, from 10 to 500 µm is preferred, and from 20 to 200 µm is particularly preferred.

The base film may have an uneven pattern on one side or on both sides. The uneven pattern may be formed by a processing method such as embossing, hairline processing, chemical etching or the like.

The present laminate has a clear layer.

The clear layer is a layer formed by curing a predetermined composition.

In the following, the composition to be used to form the clear layer will be referred to also as composition (f).

Composition (f) contains a fluorinated polymer having hydroxy or carboxy groups (hereinafter referred to also as fluorinated polymer A).

Fluorinated polymer A preferably contains units based on a fluoroolefin (hereinafter referred to also as units A1) and units having hydroxy or carboxy groups (hereinafter referred to also as units A2).

When the above fluorinated polymer A is used, the hydroxy groups or carboxy groups which the fluorinated polymer A has, will undergo crosslinking reaction to form a clear layer containing the fluorinated polymer having a crosslinked structure. Here, at the time of letting the hydroxy groups or carboxy groups undergo a crosslinking reaction, a predetermined curing agent is reacted as will be described later.

A fluoroolefin is an olefin in which at least one of the hydrogen atoms is substituted by a fluorine atom. A fluoroolefin may be such that at least one of the hydrogen atoms not substituted by a fluorine atom may be substituted by a chlorine atom. The number of carbon atoms in the fluoroolefin is preferably from 2 to 8, particularly preferably from 2 to 4.

As specific examples of the fluoroolefin, $CF_2\!=\!CF_2$, $CF_2\!=\!CFCl$, $CF_2\!=\!CHF$, $CH_2\!=\!CF_2$, $CF_2\!=\!CFCF_3$, $CF_2\!=\!CHCF_3$, $CF_3CH\!=\!CHF$ and $CF_3CF\!=\!CH_2$ may be mentioned. As the fluoroolefin, from the viewpoint of copolymerizability, $CF_2\!=\!CF_2$, $CF_2\!=\!CFCl$, $CF_3CH\!=\!CHF$ and $CF_3CF\!=\!CH_2$ are preferred; $CF_2\!=\!CF_2$ and $CF_2\!=\!CFCl$ are more preferred; and $CF_2\!=\!CFCl$ is particularly preferred.

As the fluoroolefin, two or more types may be used in combination.

The content of units A1 is preferably from 20 to 70 mol %, more preferably from 40 to 60 mol %, particularly preferably from 45 to 55 mol %, to the total units contained in the fluorinated polymer A, from the viewpoint of weather resistance of the present laminate.

Units A2 may be units based on a monomer having a hydroxy group (hereinafter referred to also as monomer A21) or a monomer having a carboxy group (hereinafter referred to also as monomer A22), or may be units obtainable by converting the above functional groups of a fluorinated polymer containing units having functional groups into hydroxy groups or carboxy groups. Units A2 preferably have hydroxy groups.

The hydroxy group or carboxy group is a group that reacts with the curing agent as described later.

Units A2 preferably have no fluorine atoms.

As monomer A21, allyl alcohol, and a vinyl ether, vinyl ester, allyl ether, allyl ester and (meth)acrylate, having a hydroxy group, may be mentioned, and allyl alcohol and a monomer represented by the formula $X^{11}$—$Z^{11}$ are preferred.

$X^{11}$ is $CH_2$=CHC(O)O—, $CH_2$=C(CH_3)C(O)O—, $CH_2$=CHOC(O)—, $CH_2$=CHCH_2OC(O)—, $CH_2$=CHO— or $CH_2$=CHCH_2O—, preferably $CH_2$=CHO— or $CH_2$=CHCH_2O—.

$Z^{11}$ is a $C_{2-42}$ monovalent organic group having a hydroxy group. The above organic group may be linear or branched. Further, the above organic group may consist of a ring structure or may contain a ring structure.

As the above organic group, a $C_{2-6}$ alkyl group having a hydroxy group, an alkyl group containing a $C_{6-8}$ cycloalkylene group having a hydroxy group, a polyoxyalkylene group having a hydroxy group, a $C_{2-6}$ alkyl group to which a polyoxyalkylene group having a hydroxy group is bonded, and an alkyl group having a $C_{6-8}$ cycloalkylene group to which a polyoxyalkylene group having a hydroxy group, is bonded, are preferred.

As the polyoxyalkylene group, a polyoxyalkylene group composed mainly of oxyethylene groups, is preferred. As the oxyalkylene group other than an oxyethylene group, a $C_{3-6}$ oxyalkylene group such as an oxypropylene group, a 1,2-oxybutylene group or a 1,4-oxybutylene group may be mentioned, and an oxypropylene group is preferred. The ratio of oxyethylene groups to all oxyalkylene groups in a polyoxyalkylene group is preferably from 60 to 100 mol %, more preferably from 80 to 100 mol %, particularly preferably 100 mol % (i.e. polyoxyethylene groups).

Further, the number of oxyalkylene groups in the polyoxyalkylene group is preferably at least 4, more preferably from 6 to 40, particularly preferably from 8 to 24.

As specific examples of monomer A21, $CH_2$=CHO—$CH_2$-cyclo$C_6H_{10}$—$CH_2OH$, $CH_2$=CHCH_2O—$CH_2$-cyclo$C_6H_{10}$—$CH_2OH$, $CH_2$=CHOCH_2CH_2OH, $CH_2$=CHCH_2OCH_2CH_2OH, $CH_2$=CHOCH_2CH_2CH_2CH_2OH, $CH_2$=CHCH_2OCH_2CH_2CH_2CH_2OH, $CH_2$=CHOCH_2-cyclo$C_6H_{10}$—$CH_2$—$(OCH_2CH_2)_n$OH, $CH_2$=CHOCH_2CH_2(OCH_2CH_2)_n$OH and $CH_2$=CHCH_2OCH_2CH_2(OCH_2CH_2)_n$OH may be mentioned.

Here, the "-cyclo$C_6H_{10}$—" represents a cyclohexylene group, and the bonding site of (-cyclo$C_6H_{10}$—) is usually 1,4-. n is an integer of from 8 to 24.

As monomer A21, two or more types may be used in combination.

As monomer A22, a polymerizable unsaturated carboxylic acid such as (meth)acrylic acid, may be mentioned, and a monomer represented by the formula $X^{12}$—$Z^{12}$ is preferred. $X^{12}$ is $CH_2$=CH—, CH(CH_3)=CH— or $CH_2$=C(CH_3)—, preferably $CH_2$=CH— or $CH_2$=C(CH_3)—. $Z^{12}$ is a carboxy group or a $C_{1-12}$ monovalent saturated hydrocarbon group having a carboxy group, preferably a carboxy group or a $C_{1-10}$ carboxyalkyl group.

As specific examples of monomer A22, compounds represented by $CH_2$=CHCOOH, $CH_2$=C(CH_3)COOH, $CH_2$=CH(CH_2)_{n1}COOH and $CH_2$=C(CH_3)(CH_2)_{n1}COOH (where n1 represents an integer of from 1 to 10) may be mentioned.

As monomer A22, two or more types may be used in combination.

The content of units A2 is preferably from 5 to 60 mol %, more preferably from 15 to 50 mol %, particularly preferably from 25 to 45 mol %, to all units contained in the fluorinated polymer A. When the content of units A2 is at least 5 mol %, the solvent resistance of the present laminate will be more excellent. When the content of units A2 is at most 60 mol %, the stretchability of the present laminate will be more excellent.

The fluorinated polymer A preferably further contains units (hereinafter referred to also as units A3) based on a monomer (hereinafter referred to also as monomer A3) having neither hydroxy group nor carboxy group. Monomer A3 is preferably a monomer that does not have any reactive groups other than hydroxy and carboxy groups that react with the curing agent as described later. Further, monomer A3 preferably contains no fluorine atoms.

As monomer A3, a monomer selected from the group consisting of vinyl ethers, vinyl esters, allyl ethers, allyl esters and (meth)acrylates is preferred.

As units A3, units based on a monomer represented by the formula $X^2$—$Y^2$ are preferred.

$X^2$ is $CH_2$=CHC(O)O—, $CH_2$=C'CH_3)C(O)O—, $CH_2$=CHOC(O)—, $CH_2$=CHCH_2OC(O)—, $CH_2$=CHO— or $CH_2$=CHCH_2O—, and, from such a viewpoint that the weather resistance of the present laminate will be excellent, is preferably $CH_2$=CHOC(O)—, $CH_2$=CHCH_2OC(O)—, $CH_2$=CHO— or $CH_2$=CHCH_2O—, particularly preferably $CH_2$=CHO—.

$Y^2$ is a $C_{1-24}$ monovalent hydrocarbon group. The monovalent hydrocarbon group may be linear or branched. Further, the monovalent hydrocarbon group may consist of a ring structure, or may contain a ring structure. Further, the monovalent hydrocarbon group may be a monovalent saturated hydrocarbon group or a monovalent unsaturated hydrocarbon group.

As the monovalent hydrocarbon group, an alkyl group, a cycloalkyl group, an aryl group, an aralkyl group and a cycloalkylalkyl group are preferred, and a $C_{2-12}$ alkyl group, a $C_{6-10}$ cycloalkyl group, a $C_{6-10}$ aryl group, a $C_{7-12}$ aralkyl group and a $C_{6-10}$ cycloalkylalkyl group are particularly preferred.

As specific examples of the alkyl group, a methyl group, an ethyl group, a tert-butyl group, a hexyl group, a nonyl group, a decyl group and a dodecyl group may be mentioned.

As a specific example of the cycloalkyl group, a cyclohexyl group may be mentioned.

As a specific example of the aralkyl group, a benzyl group may be mentioned.

As a specific example of the cycloalkylalkyl group, a cyclohexylmethyl group may be mentioned.

As specific examples of the aryl group, a phenyl group and a naphthyl group may be mentioned.

A hydrogen atom in a cycloalkyl group, in a cycloalkyl portion of a cycloalkyl group in an aryl group, or in an aryl portion of an aralkyl group may be substituted by an alkyl group. In this case, the number of carbon atoms in the alkyl group as the substituent is not included in the number of carbon atoms in the cycloalkyl group, the aryl group or the aralkyl group.

As monomer A3, two or more types may be used in combination.

As specific examples of monomer A3, ethyl vinyl ether, tert-butyl vinyl ether, 2-ethylhexyl vinyl ether, cyclohexyl vinyl ether, vinyl acetate, vinyl pivalate, vinyl neononanoate (trade name "VeoVa 9", HEXION), vinyl neodecanoate (trade name "VeoVa 10", HEXION), vinyl versatate, vinyl benzoate, tert-butyl vinyl benzoate, tert-butyl (meth)acrylate and benzyl (meth)acrylate, may be mentioned.

The content of units A3 is preferably from 1 to 60 mol %, more preferably from 5 to mol %, particularly preferably from 10 to 30 mol %, to all units contained in the fluorinated polymer A.

In addition to the above-mentioned units, the fluorinated polymer A may also contain units having a reactive group other than hydroxy or carboxy group.

As the above reactive group, for example, an epoxy group, a hydrolyzable silyl group, an amino group, etc. may be mentioned.

The fluorinated polymer A contains units A1, units A2 and units A3, in this order, preferably from 20 to 70 mol %, from 5 to 60 mol % and from 1 to 60 mol %, more preferably from 40 to 60 mol %, from 15 to 50 mol % and from 5 to 55 mol %, particularly preferably from 45 to 55 mol %, from 25 to 45 mol % and from 10 to 30 mol %, to all units contained in the fluorinated polymer A.

The hydroxy value or acid number of the fluorinated polymer A is at least 20 mgKOH/g, preferably at least 50 mgKOH/g, particularly preferably at least 150 mgKOH/g. The hydroxy value or acid number above is preferably at most 400 mgKOH/g, more preferably at most 300 mgKOH/g, particularly preferably at most 200 mgKOH/g.

The fluorinated polymer A may have both hydroxy value and acid value, and in such a case, either one of the hydroxy value or acid value may be within the above range. It is preferred that the fluorinated polymer A has a hydroxy value and that the hydroxy value is within the above range.

Tg of the fluorinated polymer A is preferably from 10 to 150° C., more preferably from 15 to 120° C., particularly preferably from 20 to 60° C., from such a viewpoint that the stretchability of the present laminate will be better.

Mn of the fluorinated polymer A is preferably at least 1,000, more preferably at least 2,000, particularly preferably at least 3,000. The above Mn is preferably at most more preferably at most 25,000, particularly preferably at most 6,000. By adjusting the above Mn to be within the above range, the stretchability and solvent resistance of the clear layer will be more well-balanced and superior.

Preferred specific forms of the fluorinated polymer A are as follows.

A fluorinated polymer comprising units A1 based on $CF_2=CFCl$, units A2 based on at least one type of monomer selected from the group consisting of a vinyl ether having a hydroxy group and an allyl ether having a hydroxy group, and units A3 based on at least one type of monomer selected from the group consisting of a vinyl ether and a vinyl ester having no reactive group.

A fluorinated polymer comprising units A1 based on $CF_2=CFCl$, units A2 based on at least one type of monomer selected from the group consisting of a vinyl ether having a hydroxy group and an allyl ether having a hydroxy group, and units A3 based on at least one type of monomer selected from the group consisting of a vinyl ether and a vinyl ester having no reactive group, wherein the contents of the above units to all units of the fluorinated polymer are, from 40 to 60 mol %, from 15 to 50 mol % and from 5 to 55 mol %, respectively, in this order.

A fluorinated polymer comprising units A1 based on $CF_2=CFCl$, units A2 based on a vinyl ether having a hydroxy group, and units A3 based on a vinyl ether having no reactive group, wherein the contents of the above units to all units of the fluorinated polymer are from 45 to 55 mol %, from 25 to 45 mol % and from 10 to 30 mol %, respectively, in this order.

In the above forms, in the units contained in the fluorinated polymer A, the alternating copolymerization ratio of units A1 and units other than units A1 tends to be high, and the present laminate will be excellent in weather resistance. Further, since units A2 will be evenly arranged in the fluorinated polymer A, the clear layer will be easily formed uniformly, and the stretchability of the present laminate will be more excellent.

As the fluorinated polymer A, two or more types may be used in combination.

The content of the fluorinated polymer A in the composition (f) is preferably from 0.1 to 25 mass %, more preferably from 0.5 to 10 mass %, particularly preferably from 1 to 4 mass %, to the total solid content of the composition (f) from such a viewpoint that the stretchability of the present laminate will be more excellent.

The composition (f) contains a non-fluorinated polymer.

The non-fluorinated polymer in the present invention is a polymer that contains substantially no fluorine atoms.

The non-fluorinated polymer contains substantially no fluorine atoms, is meant that the content of fluorine atoms is from 0 to 1 mol %, preferably from 0 to 0.1 mol %, more preferably from 0 to 0.01 mol %, particularly preferably 0 mol %, to all atoms in the non-fluorinated polymer.

The composition (f) preferably contains, as the non-fluorinated polymer, at least one type selected from the group consisting of a (meth)acrylic polymer, a polyester polymer, a polyoxyalkylene polymer and a polycarbonate polymer.

Further, the non-fluorinated polymer preferably has reactive groups such as hydroxy group, carboxy groups, etc., particularly preferably has hydroxy groups. The number of reactive groups that the non-fluorinated polymer has in one molecule is preferably at least one, more preferably at least two. There is no particular upper limit to the number of the above reactive groups, and, for example, at most 1,000.

That is, the above (meth)acrylic polymer is preferably a (meth)acrylic polymer having two or more hydroxy groups (hereinafter referred to also as an acrylic polyol), the above polyester polymer is preferably a polyester polyol, the above polyoxyalkylene polymer is preferably a polyoxyalkylene polyol, and the above polycarbonate polymer is preferably a polycarbonate polyol.

The composition (f) preferably contains, as the non-fluorinated polymer, at least a (meth)acrylic polymer.

An acrylic polyol as one form of the (meth)acrylic polymer, is a polymer containing units based on a (meth)acrylate having no hydroxy group and units based on a monomer having a hydroxy group, and is a compound having two or more hydroxy groups in one molecule. As specific examples of the monomer having a hydroxy group, a hydroxyethyl (meth)acrylate, a hydroxypropyl (meth)acrylate, a 3-chloro-2-hydroxypropyl (meth)acrylate and an allyl alcohol may be mentioned. The acrylic polyol may contain units based on monomers other than those listed above, and such monomers may, for example, be (meth)acrylic acid, styrene, α-methylstyrene, vinyl toluene, (meth)acrylamide and its derivatives, vinyl acetate and maleic anhydride. Further, the acrylic polyol often has carboxy groups and usually has an acid value along with the hydroxy value.

The hydroxy value of the (meth)acrylic polymer having hydroxy groups is preferably from 1 to 200 mgKOH/g, more preferably from 10 to 120 mgKOH/g, further preferably from 20 to 80 mgKOH/g, particularly preferably from 30 to 50 mgKOH/g. The acid value of the (meth)acrylic polymer having hydroxy groups is preferably from 1 to 50 mgKOH/g, particularly preferably from 1 to 10 mgKOH/g.

The acid value of the (meth)acrylic polymer having carboxy groups is preferably from 1 to 200 mgKOH/g, more preferably from 1 to 50 mgKOH/g, further preferably from 1 to 10 mgKOH/g, particularly preferably from 1.0 to 10 mgKOH/g.

Mn of the (meth)acrylic polymer is preferably from 5,000 to 200,000, more preferably from 10,000 to 90,000, particularly preferably from 10,000 to 60,000.

Mw of the (meth)acrylic polymer is preferably from 1,000 to 200,000, more preferably from 2,000 to 100,000, particularly preferably from 5,000 to 80,000.

Tg of the (meth)acrylic polymer is preferably from 1 to 200° C., more preferably from 50 to 150° C., particularly preferably from 80 to 130° C.

As the (meth)acrylic polymer, it is preferred to use two or more types in combination, and it is particularly preferred to use two types in combination. If the two types of the (meth)acrylic polymer are designated as AC1 and AC2, respectively, it is preferred that Tg of AC1 is larger than Tg of AC2. Further, it is preferred that Mw of AC2 is larger than Mw of AC1. That is, the physical properties of AC1 and AC2 satisfy at least one of the following relational formulas, and preferably satisfy both.

$$Tg\ of\ AC1 > Tg\ of\ AC2$$

$$Mw\ of\ AC1 < Mw\ of\ AC2$$

The difference in Tg between AC1 and AC2 is preferably at least 5° C., preferably at least 10° C., particularly preferably at least 15° C., from the viewpoint of the solvent resistance of the laminate.

The difference in Mw between AC1 and AC2 is preferably at least 1,000, more preferably at least 10,000, further preferably at least 30,000, particularly preferably at least 50,000, from the viewpoint of the stretchability of the laminate.

A part of the (meth)acrylic polymer in the composition (f) may be a silicone-modified (meth)acrylic polymer. As the silicone-modified (meth)acrylic polymer, a silicone-modified acrylic polyol is preferred.

In a case where the composition (f) contains a silicone-modified (meth)acrylic polymer, the surface smoothness and blocking resistance of the clear layer to be formed by using the composition (f) can be improved.

In a case where the composition (f) contains a silicone-modified (meth)acrylic polymer, the content of the silicone-modified (meth)acrylic polymer is preferably from to 5 mass %, more preferably from 0.005 to 3 mass %, particularly preferably from 0.01 to 1 mass %, to the total mass of the (meth)acrylic polymer in the composition (f).

The content of the (meth)acrylic polymer in the composition (f) is preferably from to 100 mass %, more preferably from 70 to 99 mass %, particularly preferably from 85 to 96 mass %, to the total mass of the non-fluorinated polymer.

In a case where the composition (f) contains two types of the (meth)acrylic polymer AC1 and AC2, the ratio of the content of AC1 to the content of AC2 (AC1/AC2) in the total mass of the (meth)acrylic polymer is preferably from 1/99 to 99/1, more preferably from 60/40 to 95/5, particularly preferably from 70/30 to 90/10.

Here, both AC1 and AC2 are preferably non-silicone-modified (meth)acrylic polymers.

The non-fluorinated polymer may be a polyester polymer, a polyoxyalkylene polymer or a polycarbonate polymer. As mentioned above, these polymers are preferably polymers having hydroxy groups.

The number of hydroxy groups in the polyester polymer, polyoxyalkylene polymer and polycarbonate polymer having hydroxy groups is preferably from 2 to 4, particularly preferably 2.

As the polyester polymer having hydroxy groups, a polyester diol having a residue of a dicarboxylic acid such as adipic acid or phthalic acid and a residue of a $C_{2-8}$ aliphatic diol, may be mentioned.

As the polycarbonate polymer having hydroxy groups, a polycarbonate diol having a residue of a $C_{4-12}$ aliphatic diol or alicyclic diol, may be mentioned.

The non-fluorinated polymer preferably contains a polyoxyalkylene polymer.

As a polyoxyalkylene polyol as one form of the polyoxyalkylene polymer, for example, polyoxytetramethylene diol (PTMG), polyoxyethylene diol, polyoxypropylene diol, polyoxypropylene triol, and poly(oxypropylene-oxyethylene) triol may be mentioned.

Among them, PTMG is particularly preferred as the polyoxyalkylene polyol.

Mn of the polyoxyalkylene polymer is preferably from 200 to 10,000, more preferably from 400 to 6,000, particularly preferably from 600 to 2,000.

The content of the polyoxyalkylene polymer is preferably from 0.5 to 70 mass %, more preferably from 1 to 30 mass %, particularly preferably from 3 to 15 mass %, to the total mass of the non-fluorinated polymer.

As the non-fluorinated polymer, two or more types may be used, and it is preferred to use two or more types.

The content of the non-fluorinated polymer in the composition (f) is preferably from to 99 mass %, more preferably from 55 to 95 mass %, particularly preferably from 65 to 85 mass %, to the total solid content of the composition (f).

In the composition (f), the content of the fluorinated polymer A to the total content of the fluorinated polymer A and non-fluorinated polymer is at most 30 mass %, preferably at most 10 mass %, particularly preferably at most 5 mass %. Further, the above content is preferably at least 0.1 mass %, more preferably at least 0.5 mass %, particularly preferably at least 1 mass %.

The composition (f) contains a curing agent.

The curing agent in the present invention has at least two functional groups in one molecule that can react with hydroxy groups or carboxy groups. When the curing agent reacts with the hydroxy or carboxy group possessed by the fluorinated polymer A and the hydroxy group possessed by the non-fluorinated polymer as the case requires, the fluorinated polymers A each other, the non-fluorinated polymers each other, and/or the fluorinated polymer A and the non-fluorinated polymer, are cross-linked to form a clear layer.

The curing agent usually has from 2 to 30 functional groups that can react with hydroxy or carboxy groups.

As a specific example of the curing agent, a compound having at least two isocyanate groups or epoxy groups in one molecule, may be mentioned.

As the curing agent, a polyisocyanate curing agent is preferred.

The polyisocyanate curing agent is a compound having at least two isocyanate groups or blocked isocyanate groups in one molecule.

As specific examples of the polyisocyanate, an alicyclic polyisocyanate, an aliphatic polyisocyanate, an aromatic polyisocyanate and derivatives of these polyisocyanates, may be mentioned. As specific examples of the polyisocyanate derivative, oligomers or modified forms (adduct, allophanate, biuret, isocyanurate, etc.) of the polyisocyanate may be mentioned.

As specific examples of the aliphatic polyisocyanate, tetramethylene diisocyanate, pentamethylene diisocyanate, hexamethylene diisocyanate, 2,2,4-trimethyl-1,6-diisocyanatohexane, lysine triisocyanate, 4-isocyanatomethyl-1,8-octamethylene diisocyanate and bis(2-isocyanatoethyl)2-isocyanato glutarate may be mentioned.

As specific examples of the alicyclic polyisocyanate, alicyclic diisocyanates such as isophorone diisocyanate, 1,3-bis(isocyanatomethyl)-cyclohexane, 4,4'-dicyclohexylmethane diisocyanate, norbornene diisocyanate, hydrogenated xylylene diisocyanate, etc. may be mentioned.

As specific examples of the aromatic polyisocyanate, aromatic diisocyanates such as xylylene diisocyanate, etc. may be mentioned.

The polyisocyanate curing agent may be a compound in which at least two isocyanate groups possessed by the above-described polyisocyanate are blocked by a blocking agent.

From the isocyanate groups blocked by the blocking agent, the blocking agent will be released by heating during curing of the composition (f) to become isocyanate groups, which will react with the hydroxy groups or carboxy groups of the fluorinated polymer A or the hydroxy groups of the non-fluorinated polymer to let the fluorinated polymer A or the non-fluorinated polymer be cross-linked.

The blocking agent is a compound having active hydrogen, and as specific examples, an alcohol, a phenol, active methylene, an amine, an imine, an acid amide, a lactam, an oxime, a pyrazole, an imidazole, an imidazoline, a pyrimidine and a guanidine may be mentioned.

In the composition (f) containing a polyisocyanate curing agent that is blocked, the curing agent and the fluorinated polymer A or non-fluorinated polymer are less likely to react at room temperature, which makes the composition (f) shelf-stable and eliminates the need to mix the respective components immediately before coating.

The content of the curing agent (e.g. a polyisocyanate curing agent) in the composition (f) is preferably from 5 to 50 mass %, more preferably from 7 to 30 mass %, particularly preferably from 10 to 20 mass %, to the total solid content of the composition (f).

The composition (f) may contain, as the case requires, components other than the fluorinated polymer A, non-fluorinated polymer and curing agent (hereinafter referred to also as additives). As such components, for example, a curing catalyst, a filler (inorganic filler such as silica, organic filler such as resin beads, etc.), a silicone compound, a colorant (a dye, an organic pigment, an inorganic pigment, a luster pigment using a metal or mica, etc.), an UV absorber, a light stabilizer, a matting agent, a degassing agent, a heat stabilizer, a thickening agent, a dispersing agent, a surfactant (fluorinated surfactant, etc.), an antistatic agent, a rust inhibitor, a silane coupling agent, an antifouling agent and a low-staining treatment agent may be mentioned.

The composition (f) preferably contains a curing catalyst among the above additives. The curing catalyst is a compound that promotes the formation of a crosslinked structure to be formed by using a curing agent, and may be selected from known curing catalysts depending on the type of the curing agent.

Among them, as the curing catalyst, a tin catalyst (such as tin octylate, tributyltin laurate, dibutyltin dilaurate, etc.), which promotes the reaction of isocyanate groups, is preferred.

As the curing catalyst, two or more types may be used in combination.

In a case where the composition (f) contains a curing catalyst, the content of the curing catalyst is preferably from 0.0001 to 5 mass %, particularly preferably from 0.01 to 1 mass %, to the total solid content of the composition (f).

The composition (f) preferably contains a silicone compound among the above additives.

The silicone compound can act as a surface modifier or a defoamer.

Here, a silicone-modified acrylic resin is not included in the silicone compound.

The silicone compound preferably contains silicone oil at least in part, and the silicone compound may be silicone oil.

The silicone compound may have reactive groups such as hydroxy groups, and the silicone compound may be cross-linked with the fluorinated polymer A by a curing agent.

As the silicone compound, two or more types may be used in combination.

In a case where the composition (f) contains a silicone compound, the content of the silicone compound is preferably from 0.005 to 10 mass %, particularly preferably from 0.01 to 1 mass %, to the total solid content of the composition (f).

The composition (f) preferably contains a light stabilizer among the above additives.

As specific examples of the light stabilizer, a hindered amine and a hindered phenol may be mentioned, and a hindered amine is preferred.

In a case where the composition (f) contains a light stabilizer, the content of the light stabilizer is preferably from 0.05 to 10 mass %, particularly preferably from 0.5 to 5 mass %, to the total solid content of the composition (f).

The composition (f) preferably contains a UV absorber among the above additives.

As specific examples of the UV absorber, a benzophenone UV absorber, a cyanoacrylate UV absorber, a triazine (especially hydroxyphenyltriazine) UV absorber and a benzotriazole UV absorber, may be mentioned, and a hydroxyphenyltriazine UV absorber is preferred.

In a case where the composition (f) contains a UV absorber, the content of the UV absorber is preferably from 0.1 to 15 mass %, particularly preferably from 1 to 10 mass %, to the total solid content of the composition (f).

The composition (f) is preferably obtained by mixing a fluorinated polymer A, a non-fluorinated polymer, a curing agent and, as the case requires, at least one of the above additives. In such a case, the composition (f) may contain a solvent. In a case where the composition (f) contains a solvent, the fluorinated polymer A and the curing agent may be dissolved or dispersed in the solvent. The composition (f) may be a powder type containing no solvent.

As the solvent, a solvent inert to the components contained in the composition (f) (such as an organic solvent having no active hydrogen) is used. For example, in a case where a curing agent having isocyanate groups is contained as a curing agent, a solvent that does not have groups that can react with isocyanate groups, such as hydroxy groups, is used. Further, in a case where a polyisocyanate curing agent that is blocked is used, a solvent having active hydrogen such as hydroxy groups can also be used, because the composition (f) can be applied and dried to remove the solvent, followed by heating to cross-link the fluorinated polymer A or non-fluorinated polymer.

In a case where the composition (f) contains a solvent, the solvent is preferably an organic solvent.

As specific examples of the organic solvent, a ketone, an ester and a hydrocarbon may be mentioned.

As the organic solvent, two or more types may be used in combination.

The content of the organic solvent in the composition (f) is preferably 1 to 90 mass %, particularly preferably from 10 to 35 mass %, to the total mass of the composition (f) from the viewpoint of the storage stability and coating efficiency of the composition of the present invention.

As a specific example of the method for forming a clear layer, a method of applying the composition (f) on the surface where the clear layer is to be formed to obtain a coating layer, and then curing the obtained coating layer to obtain a coating film.

As a specific example of the coating method, a method of using a spray, an applicator, a die coater, a bar coater, a roll coater, a comma coater, a roller brush, a brush or a spatula, may be mentioned.

In a case where the composition (f) contains a solvent, after applying the composition (f), it may be heated and dried to remove the solvent in the composition (f).

Curing of the coating layer can be carried out, for example, by heating. As the heating temperature, from 30 to 250° C. is preferred, and from 50 to 150° C. is particularly preferred.

Here, in a case where the composition (f) is a so-called powder coating material, the clear layer may also be formed by electrostatic painting, etc.

The clear layer may contain the fluorinated polymer A, curing agent and non-fluorinated polymer in an uncrosslinked state, but preferably contains them in a crosslinked state.

Further, the clear layer may also have a function of a design layer as described later. In such a case, if a coloring agent or the like is included in the clear layer, it is possible to obtain the clear layer having also a function as a design layer.

The thickness of the clear layer is preferably from 0.5 to 200 μm, more preferably from 1 to 50 μm, particularly preferably from 2 to 20 μm.

The total light transmittance of the clear layer is preferably at least 70%, more preferably at least 80%, particularly preferably at least 90%, from the viewpoint of designability of the article with the present laminate.

The present laminate preferably has a bonding layer from the viewpoint of adhesion with the article whose surface is to be protected.

The bonding layer is a layer that bonds the present laminate and the article and preferably contains a bonding resin. As specific examples of the bonding resin, an adhesive resin, a fusible resin, a sticky resin, etc. may be mentioned.

The bonding layer can be formed, for example, by using a bonding resin or a composition containing components that react by heat, etc. to become a bonding resin. Hereinafter, the composition containing components that react by heat, etc. to become a bonding resin will be referred to also as a composition (a).

In the case of a thermally fusible resin, the thermally softened resin can be bonded to the surface of an article by cooling and solidifying the resin in a state in contact with the surface of the article. In the case of a thermally crosslinkable resin, the resin can be thermally crosslinked in a state in contact with the surface of the article and can be bonded to that surface.

As a specific example of the thermally bondable resin, a partially cross-linked thermally fusible resin with a low softening temperature, or a thermoplastic resin, may be mentioned. The bonding layer containing a thermally fusible resin can be formed by using a thermally fusible resin or a composition (a). For example, by using a composition (a) containing a polyol and a polyisocyanate, it is possible to form a bonding layer containing a thermally fusible urethane resin.

The softening temperature of the thermally fusible resin is preferably from 20 to 100° C., particularly preferably from 25 to 90° C., from the viewpoint of the blocking resistance and moldability of the present laminate.

Mw of the thermally fusible resin is preferably from 5,000 to 150,000, particularly preferably from 6,000 to 130,000, from the viewpoint of the film formation and adhesion of the bonding layer.

As the thermally fusible resin, a thermally fusible urethane resin, (meth)acrylic resin, olefin resin, vinyl chloride-vinyl acetate resin, butyral resin, etc. are preferred from the viewpoint of their excellent adhesion to a three dimensional molded product.

The bonding resin may be a thermally crosslinkable resin containing a resin as the main agent and a curing agent. As such a thermally crosslinkable resin, a thermally crosslinkable urethane resin containing a solid polyol or solid hydroxy-terminated polyurethane prepolymer and a solid polyisocyanate or solid blocked polyisocyanate, an epoxy resin containing a solid polyepoxide and a solid epoxy resin curing agent, or the like, may be mentioned.

The hydroxy-terminated polyurethane prepolymer is a prepolymer having hydroxy groups obtainable by reacting a polyisocyanate and an excess equivalent amount of a polyol.

The composition (a) may contain the above thermally crosslinkable resin or may contain the above components that will become a thermally crosslinkable resin.

The bonding layer may also have a function of a design layer as described later. In such case, if a coloring agent or the like is included in the bonding layer, it is possible to obtain a bonding layer having also a function as a design layer.

The bonding layer may contain components other than those listed above. As specific examples of the components other than those listed above, a UV absorber, a light stabilizer, a curing catalyst, an antioxidant, a surface conditioner, an anti-staining agent, a thickening agent, a defoaming agent and a conductive filler may be mentioned.

The thickness of the bonding layer preferably from 1 to 1,000 μm, more preferably from 4 to 80 μm, particularly preferably from 10 to 60 μm, from the viewpoint of the film formation and adhesiveness of the bonding layer.

The components that the composition (a) may contain are the same as the above-described components that the bonding layer may contain. The bonding resin and the components that the bonding layer may contain, may be dissolved or dispersed in the composition (a) by a solvent such as water or an organic solvent.

Further, in the example of FIG. 1, the case in which the laminate 10 has a bonding layer 12 is described, but the present laminate may not have a bonding layer so long as the present laminate can be bonded to an article.

That is, the present laminate may have at least a base film and a clear layer.

Although not shown in FIG. 1, the present laminate may have a design layer to improve the designability, etc. of the present laminate. The design layer is a layer for imparting a designability to an article. The design layer is preferably placed between the bonding layer and the clear layer.

Specifically, in a case where the laminate 10 in FIG. 1 has a design layer, an embodiment in which a bonding layer 12, a design layer, a base film 14 and a clear layer 16, are arranged in this order, or an embodiment in which a bonding layer 12, a base film 14, a design layer and a clear layer 16, are arranged in this order, may be mentioned.

Further, the bonding layer, the base film or the clear layer may also serve as a design layer, and in such a case, a design layer may not be provided.

As specific examples of the design layer, a layer formed by using a composition for forming a design layer, a layer formed by a printing method, and a layer formed by a metal vapor deposition method, may be mentioned.

As specific examples of the components to be contained in the above composition, a binder resin (a urethane resin, a (meth)acrylic resin, etc.), a colorant (a dye, an organic pigment, an inorganic pigment, a glitter pigment using a metal or mica, etc.) and a solvent (water, an organic solvent, etc.) may be mentioned.

The layer formed by a printing method is formed by using an ink (including, for example, a binder resin, a colorant and a solvent) suitable for each printing method, such as inkjet printing, screen printing, offset printing, or flexographic printing.

The layer formed by a metal vapor deposition method, is formed by using a metal such as aluminum, indium, tin or the like. From the viewpoint of easy radio wave transmission and suitability for use in automotive applications, it is preferred that the above layer is formed by using indium.

The design layer may contain components other than those listed above, as the case requires, and, specifically the components listed in the composition (a) and the components listed in the above-described composition (f) may be mentioned.

The thickness of the design layer may suitably be set depending on the application.

The present laminate may have a layer other than those listed above, and, for example, it may have, between the respective layers, a layer to enhance adhesion between the respective layers.

There is no limit to the method for producing the present laminate, and, for example, on a clear layer formed in advance, a prescribed thermoplastic resin may be rolled in a molten state and then cooled and solidified to form a base film thereby to obtain the present laminate having the base film and the clear layer.

Otherwise, on one side of a base film, the composition (f) may be coated and cured to form a clear layer thereby to obtain the present laminate.

Still otherwise, the present laminate may be obtained by separately producing a clear layer and laminating it with a base film. The lamination method is not particularly limited.

The present laminate may be used as elongated to protect the surface of the article to be protected. The elongation direction and elongation method may be suitably selected depending on the shape of the article, the production conditions during molding, etc. The above elongation direction may be any direction, and the above elongation method may be any method. That is, elongation of the present laminate may be carried out by pulling the present laminate in a predetermined one direction or in all directions, and may be carried out by suitably heating the present laminate to expand it.

The article with the laminate (hereinafter referred to also as the present formed article) is preferably obtained by bonding the present laminate to the surface to be protected of the article.

As specific examples of the article to be surface protected, an automobile or motorcycle body, a home appliance, a solar cell, a furniture and a building construction material may be mentioned. As more specific examples, an automobile roof, a hood, a front door and a trunk door may be mentioned.

The bonding method for the present laminate is not particularly limited, and it is possible to use a vacuum forming (overlay forming) method, an in-mold forming method, an in-mold transfer forming method, an in-mold lamination molding method, an overlay transfer molding method, an overlay lamination molding method, or a hydraulic transfer method.

EXAMPLES

Hereinafter, the present invention will be described in detail with reference to Examples. However, the present invention is not limited to these Examples. Here, the amounts of the respective components in Table 1 given later are shown on a mass basis. Further, Ex. 1 to 4 are Examples of the present invention, and Ex. 5 and 6 are Comparative Examples.

Abbreviations and Details of Components Used

Polymer A1 solution: A xylene solution (polymer concentration 50%) containing a polymer which comprises units based on CTFE, units based on EVE and units based on HBVE in amounts of 50 mol %, 40 mol % and 10 mol %, respectively, in this order, to all units contained in the fluorinated polymer (hydroxy value: 57 mgKOH/g, acid value: none, Tg: 25° C., Mn: 20,000)

Polymer A2 solution: An ethyl 3-ethoxypropionate solution (polymer concentration 70%) containing a polymer which comprises units based on CTFE, units based on EVE, units based on CHVE and units based on HBVE in amounts of 50 mol %, 15 mol %, 1 mol % and 34 mol %, respectively, in this order, to all units contained in the fluorinated polymer (hydroxy value: 171 mgKOH/g, acid value: none, Tg: 30° C., Mn: 4,500)

Here, CTFE is chlorotrifluoroethylene, EVE is ethyl vinyl ether, HBVE is 4-hydroxybutyl vinyl ether, and CHVE is cyclohexyl vinyl ether.

Non-fluorinated polymer 1: LR-2697 (a (meth)acrylic polymer with hydroxy value: 41 mgKOH/g, acid value: 1.7 mgKOH/g, Tg: 119° C., Mn: 10,000, polymer concentration: 56.8 mass %, trade name of Mitsubishi Chemical Corporation)

Non-fluorinated polymer 2: 6FH-021 (a (meth)acrylic polymer with hydroxy value: 32 mgKOH/g, acid value: 4.3 mgKOH/g, Tg: 98° C., Mw: 60,000, polymer concentration: mass %, trade name of Taisei Fine Chemical Co., Ltd.)

Non-fluorinated polymer 3: Terathane 1000 (polyoxytetramethylene diol, trade name of The LYCRA Company)

Non-fluorinated polymer 4: BYK-Silclean 3700 (a 25 mass % solution, a silicone surface conditioning agent, a silicone-modified (meth)acrylic polymer containing hydroxy groups, trade name of BYK)

Silicone compound 1: Disparlon 1933 (a silicone antifoaming agent, trade name of Kusumoto Chemicals, Ltd.)

Silicone compound 2: KF-96 (a silicone oil, trade name of Shin-Etsu Chemical Co., Ltd.)

Curing catalyst 1: U-CAT SA102 (10 times diluted product, trade name of San-Apro Ltd.)

Curing catalyst 2: DBTDL (1,000 times diluted product of dibutyltin dilaurate)

Light stabilizer: Tinuvin 123 (trade name of BASF)

UV absorber: Tinuvin 477 (hydroxyphenyltriazine-type, trade name of BASF)

Curing agent: 24A-100 (hexamethylene diisocyanate curing agent, trade name of Asahi Kasei Corporation)

Here, the diluted products in curing catalyst 1 and curing catalyst 2 mean that the respective commercial products are diluted with a solvent (xylene) at a specified ratio (on a mass basis).

Ex. 1 to 6

The respective components listed in the column for components of composition in Table 1 were mixed to obtain a composition in each Ex.

Next, on one side of the base film (150 μm thick urethane resin film), the composition of each Ex. was applied, dried at 25° C. to remove the solvent, and then heated at 80° C. for 5 minutes for cross-linking and curing to form a clear layer with a thickness of 6 μm. Thereby, a laminate in each Ex. having a base film and a clear layer in this order, was obtained.

The obtained laminate was evaluated as described below. The results are shown in Table 1.

<Stretchability>

A test specimen was prepared by using the laminate in each Ex. Based on the tensile strength and elongation tests of JIS Z0237, the elongation rate of the test specimen was measured using a Tensilon universal testing machine (manufactured by A&D, RTC-1250A) under an environment of 23° C. Here, the gripping interval of the chuck at the beginning of the tensile testing machine was 100 mm, and the pulling speed was 100 mill's, whereby the elongation until the clear layer broke on the test specimen was measured, and the elongation rate was calculated in accordance with the following formula.

Elongation (%) $E=(L1-L0)/L0\times100$

E: Elongation (%)
L0: Distance (mm) between chucks at the beginning
L1: Distance (mm) between chucks when broken
S: The elongation of the laminate is at least 200%.
A: The elongation of the laminate is at least 150% and less than 200%.
B: The elongation of the laminate is less than 150%.

<Solvent Resistance>

A drop of xylene of approximately 10 mm in diameter was placed on the clear layer in the laminate in each Ex, and left to stand still at 23° C. for 30 minutes. Then, the laminate was left to stand still in a thermostatic bath at 90±1° C. for 1 hour, and the surface condition of the clear layer was visually checked. If any dissolved matter was found on the clear layer, by wiping, the surface condition after wiping was further checked.

S: No abnormality is found on the clear layer.
A: Dissolved matter is observed on the surface of the clear layer, but no abnormality is observed on the clear layer after wiping.
B: Traces of dissolution remain on the clear layer.

Results

In the following table, the formulations (mass ratios) of the components contained in the compositions in the respective Ex. and the evaluation results of the laminates formed by using those compositions, are shown.

In the table, the values shown in parentheses (unit: mgKOH/g) in the columns for the polymer A1 solution and polymer A2 solution are the hydroxy values of the fluorinated polymers A contained in the polymer A1 solution and polymer A2 solution, respectively.

In the table, the column for "content of fluorinated polymer (to all polymers, mass %)" indicates the mass (mass %) of fluorinated polymer A to the total content of fluorinated polymer A and non-fluorinated polymer in the composition.

TABLE 1

| | | Ex. 1 | Ex. 2 | Ex. 3 | Ex. 4 | Ex. 5 | Ex. 6 |
|---|---|---|---|---|---|---|---|
| Components of composition | Polymer A1 solution (57 mgKOH/g) | 8.0 | 2.0 | | | | 69.0 |
| | Polymer A2 solution (171 mgKOH/g) | | | 9.0 | 3.0 | 50.0 | |
| | Non-fluorinated polymer 1 | 53.5 | 62.0 | 59.0 | 54.0 | | |
| | Non-fluorinated polymer 2 | 6.0 | | 7.0 | 7.0 | | |
| | Non-fluorinated polymer 3 | 4.0 | 4.0 | 5.0 | 6.0 | 4.0 | 4.0 |
| | Non-fluorinated polymer 4 | 0.30 | 0.20 | 0.20 | 0.20 | | 0.25 |
| | Xylene | 22.6 | 26.4 | 23.2 | 24.2 | 39.5 | 20.3 |
| | Silicone compound 1 | 0.05 | 0.05 | 0.05 | 0.05 | 0.05 | |
| | Silicone compound 2 | 0.05 | 0.05 | 0.05 | 0.05 | | |
| | Curing catalyst 1 | 0.5 | 0.5 | 0.5 | 0.5 | 0.5 | 0.5 |
| | Curing catalyst 2 | | | | | 1.0 | 1.0 |
| | Light stabilizer | 1.0 | 1.0 | 1.0 | 1.0 | 1.0 | 1.0 |
| | UV absorber | 4.0 | 4.0 | 4.0 | 4.0 | 4.0 | 4.0 |
| | Curing agent | 13.5 | 14.5 | 18.0 | 15.0 | 21.5 | 8.5 |
| Content of fluorinated polymer (to all polymers, mass %) | | 5.9 | 1.5 | 8.1 | 3.1 | 89.7 | 89.5 |
| Evaluation | Stretchability | A | S | A | S | B | S |
| | Solvent resistance | A | A | A | S | B | B |

This application is a continuation of PCT Application No. PCT/JP2022/015656, filed on Mar. 29, 2022, which is based upon and claims the benefit of priority from Japanese Patent Application No. 2021-059971 filed on Mar. 31, 2021. The contents of those applications are incorporated herein by reference in their entireties.

REFERENCE SYMBOLS

10: Laminate
12: Bonding layer
14: Base film
16: Clear layer

What is claimed is:

1. A laminate, comprising a base film and a clear layer, wherein:
   the clear layer is a layer formed by curing a composition comprising a fluorinated polymer having hydroxy or carboxy groups, two different non-fluorinated (meth)acrylic polymers, and a curing agent having functional groups that react with the hydroxy or carboxy groups,
   the hydroxy value or acid value of the fluorinated polymer is at least 20 mgKOH/g, the Tg's of the two different non-fluorinated (meth)acrylic polymers differ from one another by at least 15° C.,
   the Mw of the non-fluorinated (meth)acrylic polymer having a higher Tg is lower than the Mw of the non-fluorinated (meth)acrylic polymer having a lower Tg,
   the difference in Mw between the two different non-fluorinated (meth)acrylic polymers is at least 30,000, and
   the content of the fluorinated polymer in the composition is at most 30 mass % to the total content of the fluorinated polymer and the two different non-fluorinated meth)acrylic polymers.

2. The laminate according to claim 1, wherein the content of the fluorinated polymer in the composition is at most 5 mass % to the total content of the fluorinated polymer and the two different non-fluorinated meth)acrylic polymers.

3. The laminate according to claim 1, wherein the content of the fluorinated polymer in the composition is at least 0.1 mass % to the total content of the fluorinated polymer and the two different non-fluorinated meth)acrylic polymers.

4. The laminate according to claim 1, wherein the number average molecular weight of the fluorinated polymer is at most 6,000.

5. The laminate according to claim 1, wherein the hydroxy value or acid value of the fluorinated polymer is at most 400 mgKOH/g.

6. The laminate according to claim 1, wherein the fluorinated polymer is a fluorinated polymer having hydroxy groups.

7. The laminate according to claim 1, wherein the fluorinated polymer is a fluorinated polymer having hydroxy groups and its hydroxy value is at least 150 mgKOH/g.

8. The laminate according to claim 1, wherein the composition further contains a silicone compound.

9. The laminate according to claim 8, wherein the silicone compound is a silicone oil.

10. The laminate according to claim 1, wherein the composition further contains a UV absorber.

11. The laminate according to claim 1, wherein the material constituting the base film contains at least one type selected from the group consisting of a urethane resin and a vinyl chloride resin.

12. An article with a laminate, having the laminate as defined in claim 1.

* * * * *